Aug. 11, 1936.  H. PAXTON  2,050,501
CLEAN-OUT
Filed April 25, 1934
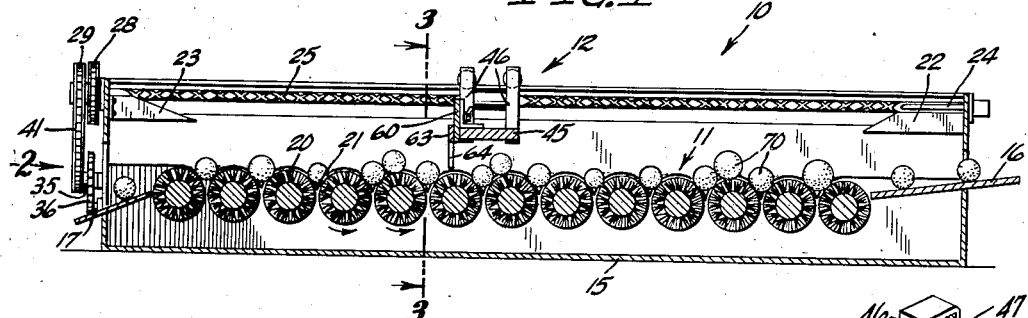
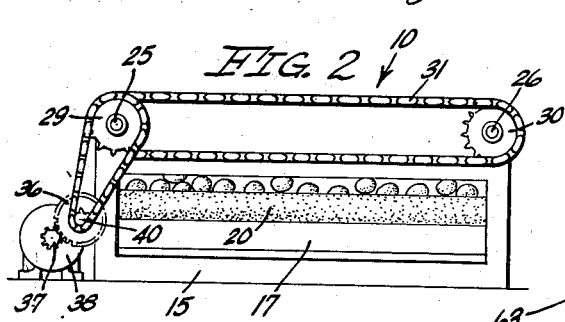
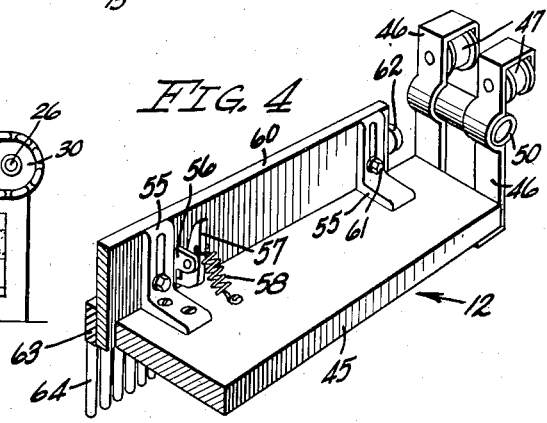
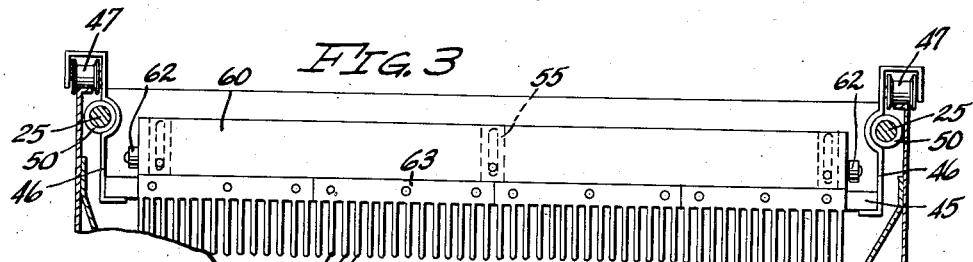
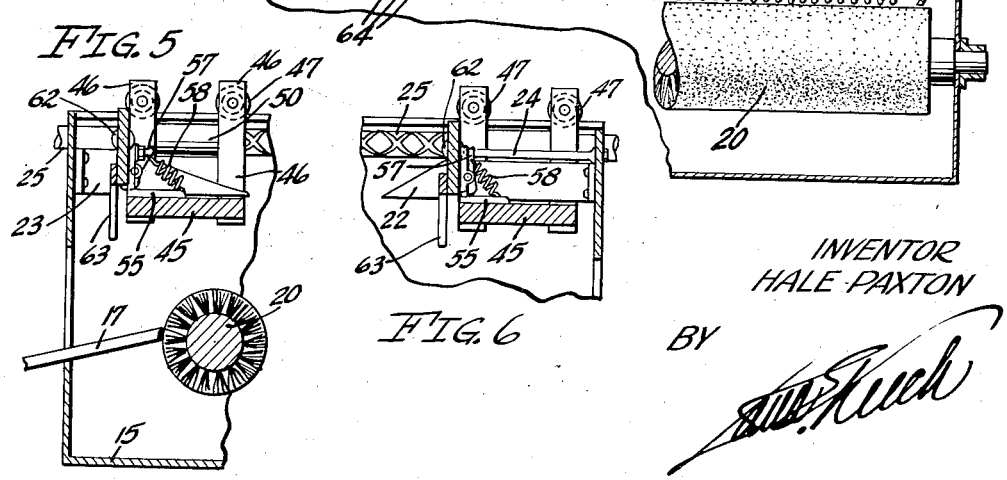
INVENTOR
HALE PAXTON
BY
ATTORNEY Patented Aug. 11, 1936

2,050,501

UNITED STATES PATENT OFFICE 2,050,501

CLEAN-OUT

Hale Paxton, Santa Ana, Calif., assignor to Paxton Credit Corporation, Santa Ana, Calif., a corporation of California Application April 25, 1934, Serial No. 722,283

2 Claims. (Cl. 198—127)

My invention relates to machines employed by packing houses for treating fruits and vegetables in the preparation of these for market, and more particularly to an improved type of clean-out mechanism to be used in combination with a fruit washing, drying or polishing machine.

The type of fruit treating machine my invention is particularly adapted to be used with embodies a plurality of cylindrical elements slightly larger in diameter than the fruit to be treated, these elements being rotatably mounted on parallel, fixed axes lying in a given horizontal plane, thus closely spacing the elements so that a series of troughs or channels are provided by the combined upper surface of these elements for supporting rows of fruit while it is being washed, dried, polished or what not.

These elements are all rotated in the same direction so that fruit resting in any of said channels is continuously rotated. Fruit is fed into the machine by rolling it over the endmost element of the series away from which the upper surfaces of the elements travel owing to their rotation. After the first channel is occupied by a row of fruit, the next fruit fed to the machine engages the first occupants of the first channel, causing them to jump over the second rotating element into the second channel.

Continued feeding of fruit to the machine thus causes the stream of fruit to be advanced in the same manner from channel to channel through the entire machine. When the stream of fruit ceases as the last of a given lot is fed to the machine, it becomes necessary to clean out the fruit resting in the channels of the machine.

An object of my invention is to provide a mechanism for automatically cleaning out the residual fruit in a fruit treating machine.

Another object of my invention is the provision of a clean-out mechanism which will be positive and thorough and yet gentle in operation so as not to bruise or otherwise injure such perishable fruits as apples, oranges, and the like.

It is common practice to use brushes as clean-out members in fruit treating machines, the disadvantage thereof being that the brushes wear out and become deformed, necessitating frequent replacement.

Therefore, a further object of my invention is to provide an improved clean-out member that will operate similarly to such brush clean-outs but which will be more durable.

Endless chains are commonly used for driving clean-out members in fruit treating machines, these chains requiring a certain space above the machine to accommodate the upper flight of the chains and the clean-out members thereon. It is an object of my invention to provide a new and improved driving means for a cleanout member that will obviate the use of these chains so as to substantially reduce the overall height of the machine.

Other objects and advantages will be made manifest in the following description taken in connection with the accompanying drawing, in which:

Fig. 1 is a vertical, longitudinal sectional view of a preferred embodiment of my invention.

Fig. 2 is an end elevational view looking in the direction of the arrow 2 of Fig. 1.

Fig. 3 is a fragmentary, enlarged sectional view taken on the line 3—3 of Fig. 1.

Fig. 4 is a fragmentary, enlarged perspective view of a portion of the machine shown in Fig. 1.

Figs. 5 and 6 are fragmentary, enlarged sectional views illustrating the operation of certain parts of the machine shown in Fig. 1.

Referring specifically to the drawing, a fruit washing machine 10 comprising a preferred embodiment of my invention is shown in Fig. 1, this machine including a treating unit 11 and a clean-out carriage 12.

The treating unit 11 includes a tank 15 having inclined inlet and outlet boards 16 and 17, respectively. Rotatably mounted within the tank 15 is a plurality of closely spaced parallel fruit cleaning brushes 20, the latter forming troughs 21 therebetween. Fixed on the inlet end of the tank 15 is a pair of cam plates 22, a pair of somewhat similar cams 23 being fixed on the outlet end of the tank 15. Mounted centrally on the inlet end of the tank 15 is an inward projecting rod 24. Rotatably mounted in the tank 15 are screws 25 and 26, each of these being formed to provide a right and left-hand thread as shown in Fig. 1.

Fixed on one end of the screw 25 is a pair of sprocket wheels 28 and 29, as seen in Fig. 1, the corresponding end of the screw 26 being provided with a sprocket 30. Trained about the sprockets 29 and 30 is a chain 31.

Journalled at one side of the tank 15 is a horizontal shaft 35, the latter being connected by suitable gears (not shown) to the shafts of the brushes 20. Fixed on one end of the shaft 35 is a gear 36 meshing with a pinion 37 of an electric motor 38. Fixed on the shaft 35 adjacent the gear 36 is a sprocket 40 positioned in radial alignment with the aforementioned sprocket 29 of the screw 25. Trained about the sprockets 40 and 29 is a chain 41.

The clean-out carriage 12 includes a horizontal board 45 having hangers 46 at its opposite ends. Rotatably mounted on the upper ends of the hangers 46 are flanged rollers 47, the latter resting on the upper edges of the sides of the tank 15 as shown in Fig. 3. Mounted on each pair of hangers 46 is a tube 50, each of the latter receiving one of the screws 25 and 26 as shown in Fig. 3. Pivoted within each of the tubes 50 is a lug (not shown) which engages one of the threads on the screw, the lug being automatically transferred from one thread to the other upon the arrival of the carriage 12 at either end of the screws 25 and 26. The operation of the screws 25 and 26 is similar to the operation of the well known "Yankee screw driver" mechanism.

Fixed to the board 45 of the carriage 12 are three slotted angle brackets 55, the central bracket 55 being formed to provide an apertured lug 56 as shown in Fig. 4. Pivoted on the lug 56, as shown in Fig. 4, is a latch 57 which is urged to the position in which it is shown in Fig. 4 by an extension spring 58. Slidable vertically at one edge of the board 45 is a plate 60, the latter being mounted by means of screws 61 extending through the slotted brackets 55. Rotatably mounted at opposite ends of the plate 60 are rollers 62 as shown in Fig. 3.

Removably secured to the plate 60 and extending downward therefrom is a pusher member 63 formed of resilient material, such as rubber, to provide a plurality of closely spaced tines 64.

*Operation*

Rotation of the motor 38 drives the shaft 35 causing the brushes to rotate in the direction indicated by the arrows of Fig. 1. The screws 25 and 26 are also rotated by means of the chains 41 and 31 causing the carriage 12 to be reciprocated from one end of the tank 15 to the other. When the carriage is moving from the inlet to the outlet end of the tank 15, the pusher member 63 is disposed in its downward position as shown in Fig. 1. As the carriage 12 nears the outlet end of the tank the cams 23 engage the rollers 62, as shown in Fig. 5, and raise the plate 60 until the latch 57 engages the under side of the plate 60. The carriage 12 then reverses its movement and starts toward the inlet end of the tank, the pusher member 63 being held in raised position by the latch 57. As the carriage 12 arrives at the inlet end of the tank the rod 24 strikes the latch 57 allowing the plate 60 to descend a slight amount until the rollers 62 rest on top of the cam plates 22 as shown in Fig. 6. The carriage then starts toward the outlet end of the tank 15, the plate 60 being lowered to its downwardmost position as the rollers 62 ride off of the cam plates 22, the latter being provided to prevent the plate 60 from suddenly dropping to its lower position.

Fruit, such as oranges 70 shown in Fig. 1, is conveyed from a soaking tank (not shown) onto the inlet board 16 and allowed to roll onto the brushes 20 of the washer 10. The fruit tends to remain in the troughs 21 between the brushes 20 until additional fruit is deposited upon the fruit already in said troughs, whereupon the tractive force exerted upon the fruit in the troughs 21 by the brushes 20 is sufficient to carry the fruit over one of the brushes 20 to the next trough. It is clear that the fruit 70 tends to feed itself through the washer 10 as long as additional fruit is fed to the machine, the moving of the fruit through the machine 10 being facilitated by the pusher 63 on the reciprocating carriage 12.

At the completion of a run of fruit through the machine 10 the residual fruit remaining in the troughs 21 is cleaned out by the pusher 63 until all fruit is discharged from the machine 10.

Although I have shown and described but one preferred form of my invention, it is to be understood that changes and modifications might be made therein without departing from the spirit and scope of the following claims.

I claim as my invention:

1. In combination: a series of substantially cylindrical parallel brushes disposed in a common plane; means for feeding fruit onto the upper surfaces of said brushes at one end of said series; means for receiving fruit from said brushes at the opposite end of said series; means for rotating said brushes at a relatively high velocity in a given direction so that the upper surfaces of said brushes turn away from said fruit feeding means and toward said fruit receiving means; a clean-out member disposed parallel to the axes of said brushes and extending downwardly substantially into contact with the uppermost surfaces thereof; a traveling carriage for carrying said clean-out member from one end of the machine to the other in a substantially horizontal, straight path at a relatively low velocity to engage the fruit successively in the valleys between adjacent brushes to cause said fruit to move forwardly over said brushes in advance of said clean-out member; means associated with the aforesaid clean-out member carriage to lift said clean-out member relative to said carriage and out of the path of fruit traveling over said brushes and return said clean-out member to the opposite end of said machine while out of contact with said fruit; and means for lowering said clean-out member at the termination of its last mentioned movement into the path of fruit traveling over said brushes and initiating a repetition of the cycle of operation, hereinabove described, of said clean-out member.

2. In combination: a series of substantially cylindrical parallel brushes disposed in a common plane; means for feeding fruit onto the upper surfaces of said brushes at one end of said series; means for receiving fruit from said brushes at the opposite end of said series; means for rotating said brushes at a relatively high velocity in a given direction so that the upper surfaces of said brushes turn away from said fruit feeding means and toward said fruit receiving means; a carriage; means for repeatedly reciprocating said carriage at a relatively low velocity over a path extending in a right line parallel with the plane in which the axes of said brushes lie and disposed above said brushes; a clean-out member supported on said carriage for vertical movement relative thereto; means for lowering said clean-out member on said carriage into the path of fruit traveling over said brushes when said clean-out member is adjacent to said fruit feeding means; means for elevating said clean-out member out of the path of said fruit when said clean-out member is disposed adjacent to said fruit receiving means; and means retaining said clean-out member in elevated position while said carriage travels from a position adjacent said fruit receiving means to a position adjacent said fruit feeding means.

HALE PAXTON.